United States Patent
Park

(10) Patent No.: US 7,330,445 B2
(45) Date of Patent: Feb. 12, 2008

(54) WIRELESS COMMUNICATION SYSTEM CAPABLE OF SAVING TIME FOR MUTUAL DATA COMMUNICATION IN SNIFF MODE

(75) Inventor: Jae-han Park, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 1112 days.

(21) Appl. No.: 10/229,282

(22) Filed: Aug. 28, 2002

(65) Prior Publication Data

US 2003/0060161 A1    Mar. 27, 2003

(30) Foreign Application Priority Data

Aug. 31, 2001 (KR) .................................. 2001-53176

(51) Int. Cl.
*H04Q 7/00* (2006.01)
(52) U.S. Cl. .................. 370/314; 370/346; 370/437; 370/458; 370/468
(58) Field of Classification Search ................ 370/314, 370/329, 331, 336, 341, 345, 346, 347, 348, 370/437, 458, 468
See application file for complete search history.

(56) References Cited

U.S. PATENT DOCUMENTS

| 6,141,336 A * | 10/2000 | Bauchot et al. ............. 370/348 |
| 6,807,159 B1 * | 10/2004 | Shorey et al. ............. 370/318 |
| 6,975,613 B1 * | 12/2005 | Johansson ................... 370/338 |

* cited by examiner

*Primary Examiner*—Chi Pham
*Assistant Examiner*—Shick Hom
(74) *Attorney, Agent, or Firm*—Sughrue Mion Pllc.

(57) ABSTRACT

A wireless communication system capable of saving time for mutual data communication in a sniff mode. The wireless communication system has: a master apparatus for calculating a sniff parameter including a time of a sniff period capable of performing the communication by allowing a corresponding device to commonly have the time in the sniff mode, when a communication mode for a mutual data communication by a user is selected to be operated in the sniff mode; and a sniff slave apparatus for performing the mutual data communication with the master apparatus by commonly having a corresponding time calculated in accordance with the sniff parameter. At this time, the sniff parameter includes at least one among a cyclic information, an allocated time information of the sniff period, and a start time information in which the master apparatus communicates with the sniff slave apparatus operated in the sniff mode.

8 Claims, 7 Drawing Sheets

| POLLING PACKET (P) | ADDRESS INFORMATION (N) |
|---|---|
| P = 1 | N = 2 |
| P = 2 | N = 4 |
| P = 3 | N = 3 |
| P = 4 | N = 5 |
| ⋮ | ⋮ |
| P = n | N = 4 |

| POLLING PACKET (P) | ADDRESS INFORMATION (N) |
|---|---|
| P = 1 | |
| P = 2 | N = 2 |
| P = 3 | |
| ⋮ | ⋮ |
| P = n | |

| POLLING PACKET (P) | ADDRESS INFORMATION (N) |
|---|---|
| P = 1 | |
| P = 2 | N = 4 |
| P = 3 | N = 2 |
| P = 4 | N = 3 |
| ⋮ | ⋮ |
| P = n | |

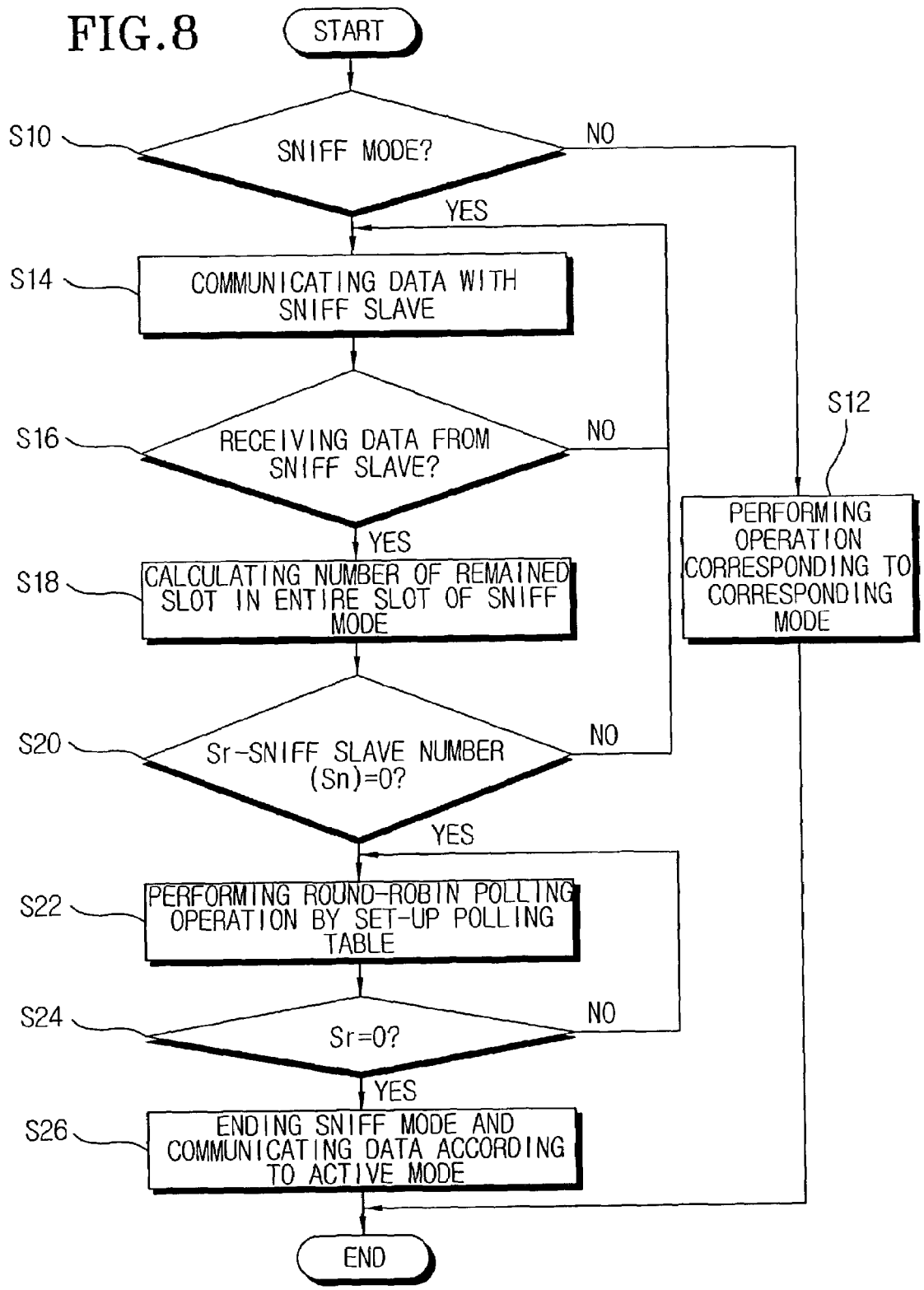

WIRELESS COMMUNICATION SYSTEM CAPABLE OF SAVING TIME FOR MUTUAL DATA COMMUNICATION IN SNIFF MODE

BACKGROUND OF THE INVENTION

1. Field of the Invention

The present invention relates to a wireless communication apparatus, and more particularly, to a wireless communication apparatus capable of performing a mutual communication according to a sniff parameter calculated based on the information with respect to sniff slave apparatuses connected with a master apparatus in a sniff mode for performing a communication for a determined time between the master apparatus and the slave apparatuses. The present application is based on Korean Application No. 2001-53176, filed Aug. 31, 2001, which is incorporated herein by reference.

2. Description of the Related Art

Bluetooth is a communication technology capable of transmitting wirelessly information such as letter data, sound data, and video data at a distance of 10 to 100 m.

A Bluetooth apparatus, which can mutually communicate according to the Bluetooth communication method, sets up a connection status that communicates through operations such as an inquiry, an inquiry scan, a page, and a page scan. From this process, a master apparatus and a slave apparatus are determined according to their respective roles.

When a new connection status is set up between the Bluetooth apparatuses, an operation clock and a frequency pattern should be adjusted between the Bluetooth apparatuses. In the process for setting up the connection status, the inquiry is an operation of repeatedly sending an operation frequency from the master apparatus so that the slave apparatus can adjust the frequency pattern with the master apparatus. The inquiry scan is a process performed in the slave apparatus. The inquiry scan detects a transmitted frequency, and adjusts a synchronism with the detected frequency. The page is a process for sending a clock signal from the master apparatus so that the slave apparatus can adjust for the operation clock of the master apparatus. The page scan is used to detect the transmitted clock signal and to adjust the synchronism thereby. The page scan is done by the slave apparatus. A network, which is formed by two or more slave apparatuses setting up the connection status in regard to the master apparatus, is a Piconet.

According to the Bluetooth communication method currently in use, a master apparatus can communicate with seven slave apparatuses by connecting the slave apparatuses to achieve an active status in the Piconet. Moreover, to connect a new slave apparatus to the Piconet, the master apparatus terminates the active status with respect to one slave apparatus among the seven slave apparatuses, and performs a communication connection in the active status with the new slave apparatus.

On the other hand, in the Bluetooth communication method, the master apparatus and the slave apparatuses are operated in an active mode for performing a normal communication with the slave apparatuses, and in a hold mode, a sniff mode, and a park mode which enables the communication apparatus to conserve power. The hold mode is a typical mode used when there is no need to send data for a relatively long period. The sniff mode is a mode for transmitting data from a certain time mutually set up between the master apparatus and the slave apparatuses for a predetermined time. The park mode is a mode for performing mutual communication between the master apparatus and the slave apparatus intermittently to allow the slave apparatus to synchronize with the master apparatus, and to acquire conversion to the active mode.

The slave apparatuses, which operate in one of the hold mode, the sniff mode, and the park mode, communicate with the master apparatus for a predetermined time during the operation time of the slave apparatuses operated in the active mode. A data transmission period (hereinbelow, referred to as a 'sniff period') of the master apparatus and the slave apparatuses according to the sniff mode is repeatedly generated at a predetermined cycle until the slave apparatuses operated in the sniff mode are converted to the active mode.

At this time, each of the slave apparatuses operated in the sniff mode can have a start time, an allocated time of the sniff period, and a sniff period generation cycle (hereinbelow, referred to as a 'sniff parameter'), respectively different. The sniff parameter is determined through a link management protocol (LMP) among Bluetooth protocol level structures. The master apparatus of the Piconet including the slave apparatuses (hereinbelow, referred to as 'a sniff slave apparatus') operated in the sniff mode allocates the different sniff parameters to the sniff slave apparatuses, and stores the differently allocated sniff parameters.

Accordingly, the master apparatus scheduling the data communication with each of the slave apparatuses needs a memory packet for storing the sniff parameter allocated to the slave apparatuses operated in the sniff mode. Therefore, a number of memory packets should be provided corresponding to at least the number of the slave apparatuses operated in the sniff mode. For example, when seven sniff slave apparatuses are connected with one Piconet, seven memory packets for storing the sniff parameter allocated to the seven sniff slave apparatuses are needed. In addition, seven sniff time sheets (hereinbelow, referred to as a 'sniff timer') for notifying the end of the corresponding sniff period to a controller (not shown) of the master apparatus by checking the timer with respect to the sniff period of each of the sniff slave apparatuses are disposed at the master apparatus in the conventional sniff mode.

In the meantime, it will sometimes happen when communicating between the master apparatus and the slave apparatuses through the conventional sniff mode that the sniff period is not allocated to the corresponding sniff slave apparatuses due to a cyclic operation having a higher priority level than the sniff slave apparatuses. The inquiry, the inquiry scan, the page, and the page scan, which are performed by the master apparatus and the slave apparatuses in the Piconet, are such cyclic operations. A supervision timeout rule, which stops the operation needed for the communication connection when a predetermined time set up for communication connection has passed, is applied in the Bluetooth communication method. Accordingly, when the operation, which is needed for the communication connection during the sniff period allocated between the master apparatus and the slave apparatuses, is not supported, the communication connection between the master apparatus and the slave apparatuses fails.

As an example of the communication apparatus utilizing the Bluetooth communication method is a personal portable terminal. Thus, memory packets corresponding to the number of the personal portable terminals operated in the sniff mode should be provided in each of the personal portable terminals. But it is not desirable to provide such memory packets, because this makes it difficult to reduce the size of the product and causes an increase in production costs. Moreover, since the master apparatus consecutively performs the data communication through the sniff parameters stored in each of the memory packets, the scheduling time for the data communication is increased.

The scheduling time for the data communication of the master apparatus is increased, since the master apparatus should allocate the sniff period in regard to each of the sniff slave apparatuses after finding the period not having a cyclic active operation when there is the cyclic active operation performed by the Piconet master apparatus.

SUMMARY OF THE INVENTION

The present invention has been made to overcome the above-mentioned problems. Thus, the object of the present invention is to provide a communication apparatus capable of reducing the amount of memory packets for storing a sniff parameter according to a sniff mode by setting up a sniff period that slave apparatuses connected with a master apparatus can commonly use so that the master apparatus and the slave apparatuses can perform a communication connection in the sniff mode.

Another object of the present invention to solve the above problem is to provide a communication apparatus that controls each of the slave apparatuses connected with a master apparatus to perform the communication with the master apparatus for an allocated time corresponding to a set-up sniff period.

Another object of the present invention to solve the above problem is to provide a communication apparatus capable of simplifying a communication scheduling operation of a master apparatus for a data communication of the master apparatus and sniff slave apparatuses in a sniff mode.

The above object is accomplished by providing a wireless communication system comprising: a master apparatus for calculating a sniff parameter including a time of a sniff period capable of performing a communication by allowing a corresponding device to commonly use the time in a sniff mode, when a communication mode for a mutual data transmission by a user is selected to be operated in the sniff mode; and a sniff slave apparatus for performing the mutual data transmission with the master apparatus by commonly using a corresponding time calculated in accordance with the sniff parameter. The master apparatus performs communication scheduling for the data communication of the sniff slave apparatus, when the sniff parameter is calculated. The sniff parameter includes a cyclic information in which the master apparatus works in the sniff mode, allocated time of the sniff period, and start time information. Moreover, it is preferable that the master apparatus performs data scheduling for data communication of the sniff slave apparatuses when the sniff parameter is calculated.

Preferably, the master apparatus includes: a parameter storage unit for storing the sniff parameter; a time counting unit for allowing the master apparatus to count a time during an allocated time of a sniff period according to the sniff mode based on an operation time in regard to the sniff mode included in the sniff parameter; and a controller for controlling the data communication with the sniff slave apparatus, and counting a number of the sniff slave apparatus operated in the sniff mode to perform the communication scheduling.

In addition, it is preferable that the master apparatus performs the communication with the sniff slave apparatus according to the communication scheduling set up in regard to the sniff slave apparatus. Also, it is preferable that the master apparatus performs a round-robin polling operation that transmits a polling packet so that there is no sniff slave apparatus unable to receive a packet from the master apparatus during the allocated time of the sniff period in the communication operation according to the communication scheduling. Accordingly, it is recommended that the controller sets up a polling table including address information with respect to the sniff slave apparatus for transmitting the polling packet in accordance with the round-robin polling operation, and the parameter storage unit stores the polling table. The time for the master apparatus to perform the round-robin polling operation is a time that the number of slots remaining in a corresponding slot of the allocated time of the sniff period is equal to the number of sniff slave apparatuses.

It is preferable that the master apparatus transmits the polling packet from the sniff slave apparatus that initially transmits the data to the master apparatus during the allocated time of the sniff period according to the round-robin polling operation. In addition, it is advisable that the master apparatus transmits the polling packet to corresponding sniff slave apparatuses one at a time. On the other hand, it is recommended that the controller ends the communication with the sniff slave apparatus with respect to the master apparatus, when there are no slots remaining in the allocated time of the sniff period.

In the meantime, a wireless communication method according to the present invention to accomplish the above object includes the steps of: calculating a sniff parameter and a predetermined time for the sniff slave apparatus to perform the communication by commonly using the time with respect to the master apparatus, when the sniff slave apparatus is set up to be operated in the sniff mode; and performing a mutual communication by the master apparatus and the slave apparatus in accordance with the sniff parameter during the calculated time.

Preferably, after the communication performing step, the wireless communication method further includes the steps of: setting up a polling table including a polling packet for providing a connection opportunity for a sniff slave apparatus that has not received any of the packets from the master apparatus during the allocated time of the sniff period according to the sniff parameter, and an address information with respect to the sniff slave apparatus to receive the polling packet; judging whether a number of slots remaining in the sniff mode and the number of sniff slave apparatuses are equal; and transmitting the polling packet to the sniff slave apparatus according to the address information, when it is judged that the number of slots remaining in the sniff mode and the number of sniff slave apparatuses are equal.

At this time, the sniff parameter includes at least one among a cyclic information, an allocated time information of the sniff period, and a start time information in which the master apparatus communicates with the sniff slave apparatus operated in the sniff mode.

According to the present invention, the master apparatus sets up the time for operating the sniff slave apparatuses in the sniff mode, and allows the set-up time to the sniff slave apparatuses so that the sniff slave apparatuses can communicate with the master apparatus. Thus, time for data transmission in the sniff mode can be saved.

BRIEF DESCRIPTION OF THE DRAWINGS

The above-mentioned objects and the features of the present invention will be more apparent by describing the preferred embodiments of the present invention by referring to the appended drawings, in which:

FIG. 4 is a view showing one preferred embodiment of a polling table of FIG. 3;

FIG. 8 is a flow chart showing a communication method capable of performing a communication by commonly having an operation time allocated in a sniff mode according to the present invention.

DETAILED DESCRIPTION OF THE PREFERRED EMBODIMENTS

From now on, a communication apparatus of the present invention will be described in great detail by referring to the appended drawings.

Figure 1:
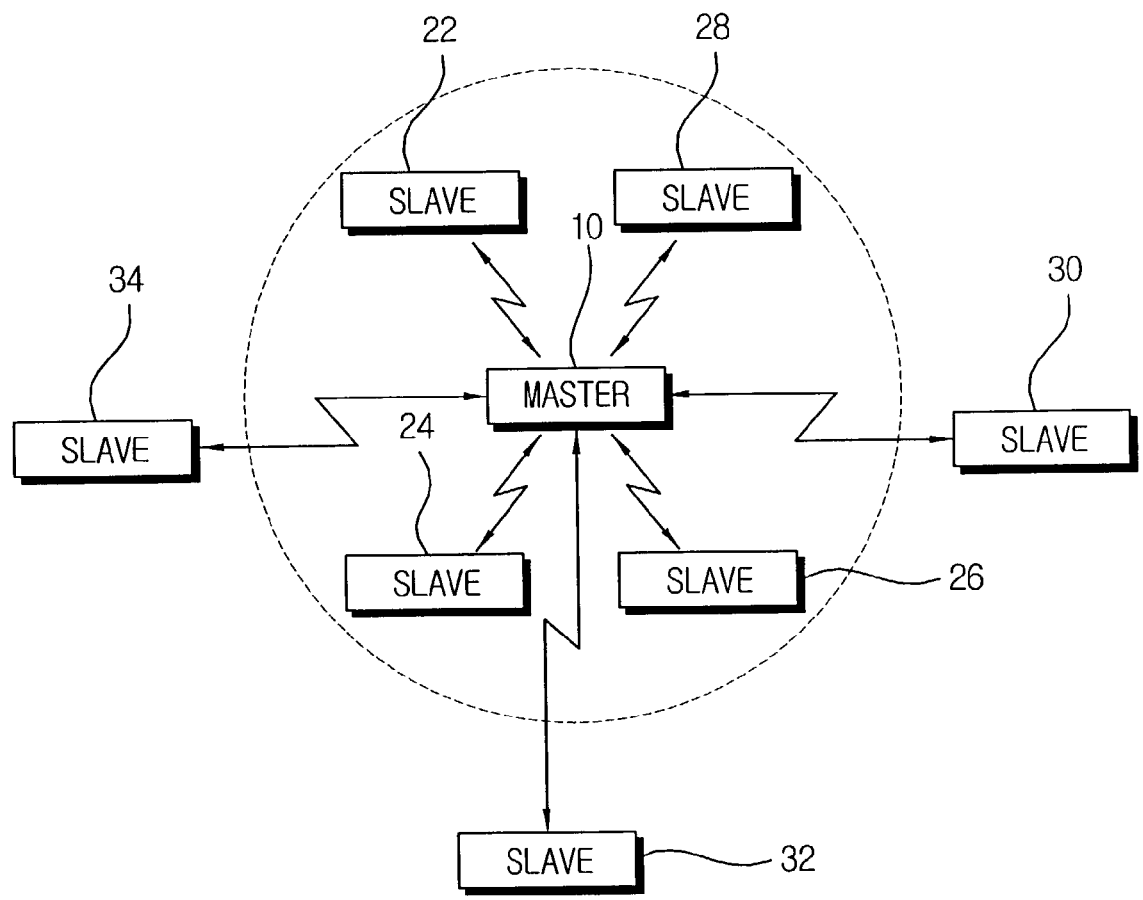
FIG. 1 is a block diagram showing the connection status of a Bluetooth apparatus according to an active mode and a sniff mode.

FIG. 1 is a block diagram showing a connection status of a Bluetooth apparatus according to an active mode and a sniff mode. A master apparatus 10 performs an inquiry for sending a driving frequency to slave apparatuses around the master apparatus 10 by using a channel (air). The slave apparatuses 22, 24, 26, 28, 30, 32, 34 perform an inquiry scan for adjusting a synchronism to the transmitted driving frequency of the master apparatus 10. Then, the master apparatus 10 performs a page for sending a driving timing clock of the master apparatus 10 to the slave apparatuses 22, 24, 26, 28, 30, 32, 34. The slave apparatuses 22, 24, 26, 28, 30, 32, 34 perform a page scan for adjusting the synchronism to the transmitted driving timing clock of the master apparatus 10.

Accordingly, the slave apparatuses 22, 24, 26, 28, 30, 32, 34 connected with the master apparatus 10 by the channel are divided into active slave apparatuses 22, 24, 26, 28 for performing an active mode communication and sniff slave apparatuses 30, 32, 34 operated in the sniff mode. At this time, the master apparatus 10 and the active slave apparatuses 22, 24, 26, 28 perform a synchronous one-to-one data transmission, and also transmit required data through a broadcasting packet. In the meantime, the master 10 and the sniff slave apparatuses 30, 32, 34 perform mutual communication through an allocated time by using a time excluding a time in which the active mode operation is performed.

On the other hand, a wireless communication system, in which the sniff slave apparatuses can commonly have the allocated operation time in the sniff mode according to the present invention as shown, includes the master apparatus 10 for calculating a sniff parameter for communication in accordance with the sniff mode when a communication mode for a mutual data exchange by a user is selected to be operated in the sniff mode, and the sniff slave apparatuses 30, 32, 34 for performing mutual data communication with the master apparatus 10 by commonly having the corresponding time set up in accordance with the sniff parameter. Accordingly, the sniff slave apparatuses 30, 32, 34 perform mutual communication in accordance with a communication scheduling set up by the master apparatus 10 while being operated in the sniff mode.

Figure 2:
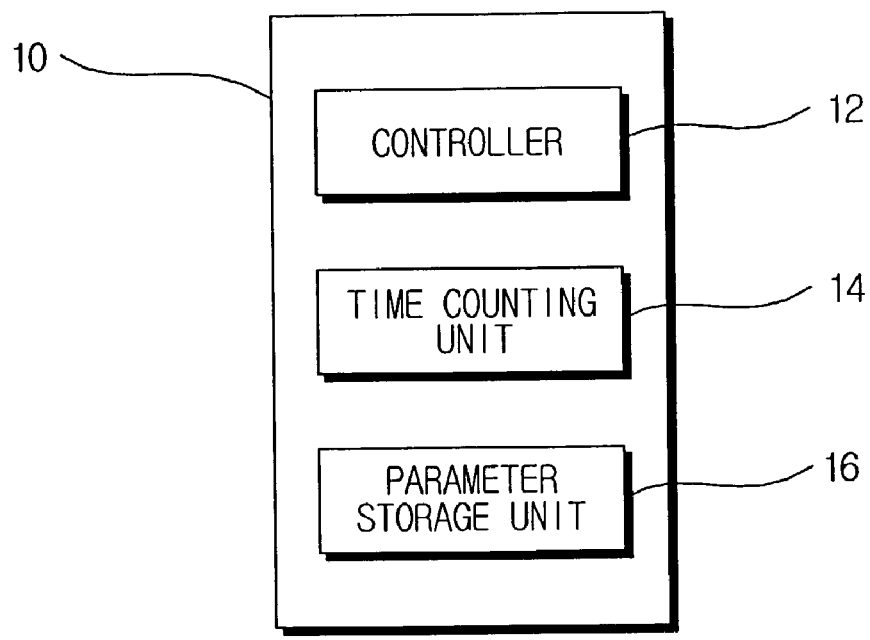
FIG. 2 is a is a block diagram showing a master apparatus of FIG. 1 in great detail.

FIG. 2 is a block diagram showing the master apparatus 10 of FIG. 1 in great detail. As shown in FIG. 2, the master apparatus 10 comprises a parameter storage unit 16 for storing the sniff parameter, a time counting unit 14 for counting a time during which the master apparatus 10 sends and receives data to and from the sniff slave apparatuses 30, 32, 34 operated in the sniff mode, and a controller 12 for controlling the data communication performed with the sniff slave apparatuses 30, 32, 34 according to the sniff mode and counting the number of the sniff slave apparatuses 30, 32, 34 operated in the sniff mode. The sniff parameter refers to a cyclic information that the slave apparatuses 30, 32, 34 operate in the sniff mode, an allocated time information of the sniff period, and a start time information. Therefore, the sniff slave apparatuses 30, 32, 34 perform the sniff operation according to the communication scheduling of the master apparatus 10 at the same time by commonly having the calculated cyclic information of the sniff parameter, the allocated time information of the sniff period, and the start time information.

The time counting unit 14 counts the time from the start time of the sniff mode in the master apparatus 10, and transmits an end time of the allocated time of the sniff period with respect to the time set up according to the sniff mode to the controller 12.

The master apparatus 10 and the sniff slave apparatuses 30, 32, 34 perform communication by commonly using the set-up time after setting up a predetermined time for mutual communication between the master apparatus 10 and the sniff slave apparatuses 30, 32, 34. The master apparatus 10 has a memory packet for storing the sniff parameter. The master apparatus 10 controls the communication by commonly having the sniff slave apparatuses 30, 32, 34 in accordance with the sniff parameter stored in the memory packet.

Figure 3:
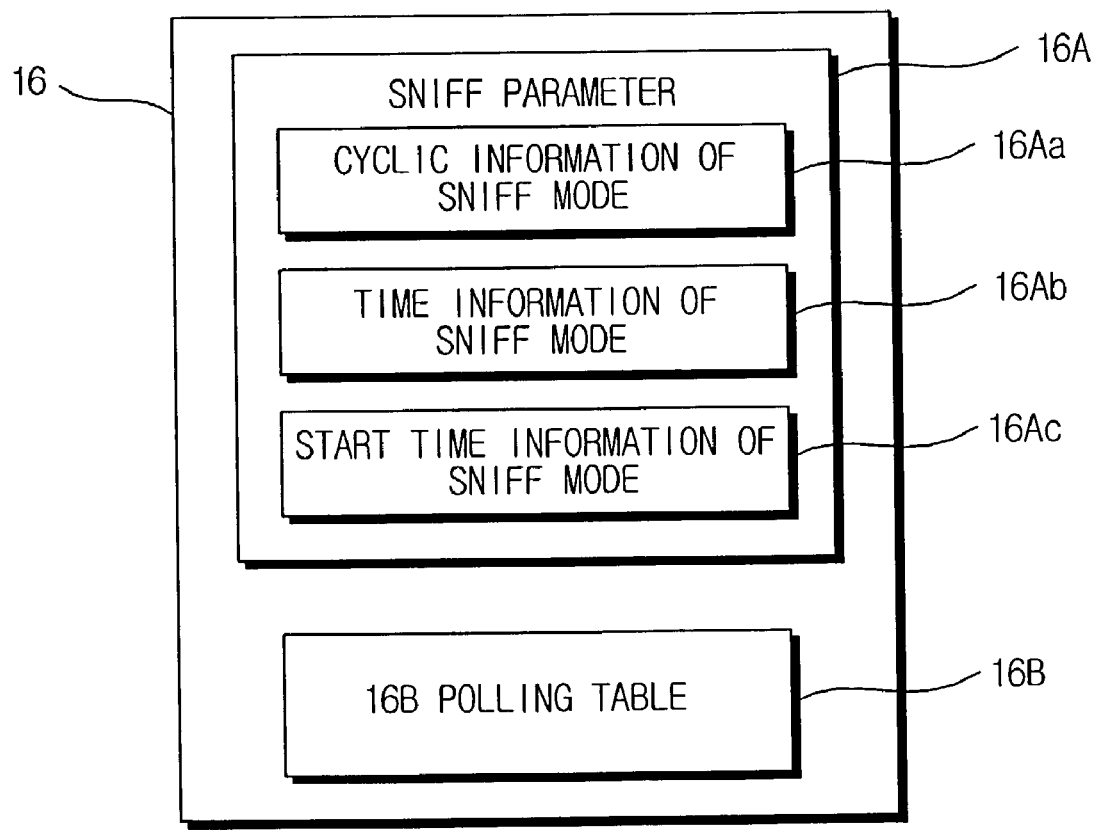
FIG. 3 is a view showing a parameter storage unit of FIG. 2 in great detail.

FIG. 3 is a view showing the parameter storage unit 16 of FIG. 2 in great detail. Referring to FIG. 3, the parameter storage unit 16 stores the sniff parameter 16A and a polling table 16B. The sniff parameter 16A is parameter information needed for the communication connection of the master apparatus 10 with the sniff slave apparatuses 30, 32, 34. On the other hand, the master apparatus 10 performs a round-robin polling operation that transmits a polling packet to provide an opportunity for connection with the master apparatus 10 to slave apparatuses that have failed to establish a communication connection in accordance with the communication scheduling. Moreover, the master apparatus 10 sets up the polling table including the address information with respect to corresponding sniff slave apparatuses for transmitting the polling packet in accordance with the round-robin polling operation. The polling table 16B is the address information in regard to the corresponding sniff slave apparatuses set up by the master apparatus 10 to transmit the polling packet to each of the slave apparatuses. It is preferable that the polling table, which is set up by the master apparatus 10, is set up consecutively from the corresponding sniff slave apparatuses that have transmitted the polling table to the master apparatus 10.

In the meantime, the sniff parameter 16A has the cyclic information 16Aa of the sniff mode, and the allocated time information 16Ab of the sniff period, and a start time information 16Ac of the sniff mode. The cyclic information 16Aa of the sniff mode is the information in regard to the cycle that the master apparatus 10 operates repeatedly according to the set-up sniff mode. The allocated time information 16Ab of the sniff period is the information in regard to the time of the period that the sniff slave apparatuses 30, 32, 34 communicate with the master apparatus 10. The start time information 16Ac of the sniff mode is the information in regard to the start time that the sniff slave apparatuses 30, 32, 34 communicate with the master apparatus 10.

FIG. 4 is a view showing the preferred embodiment of the polling table 16B of FIG. 3. Referring to FIG. 4, the polling table 16B includes the polling packet 'P' transmitted to the sniff slave apparatuses 30, 32, 34, and the address information 'N' in regard to the corresponding sniff slave apparatuses to which the corresponding polling packet 'P' is transmitted.

Referring to FIG. 4, polling packet 1 (P=1) is the table value set up to be transmitted to the sniff slave apparatus associated with the address information 'N' is '2' (N=2) by the master apparatus 10. Polling packet 2 (P=2) is the table value set up to be transmitted to the sniff slave apparatus associated with the address information 'N' is '4' (N=4) by the master apparatus 10. Polling packet 3 (P=3) is the table value set up to be transmitted to the sniff slave apparatus associated with the address information 'N' is '3' (N=3) by the master apparatus 10. Polling packet 4 (P=4) is the table value set up to be transmitted to the sniff slave apparatus associated with the address information 'N' is '5' (N=5) by the master apparatus 10. Polling packet 'n' (P=n) is the table value set up to be transmitted to the sniff slave apparatus associated with the address information 'N' is '4' (N=4) by the master apparatus 10. Accordingly, the master apparatus 10 transmits the polling packet to the sniff slave apparatus having a corresponding address in accordance with the address information 'N'.

Figure 5:
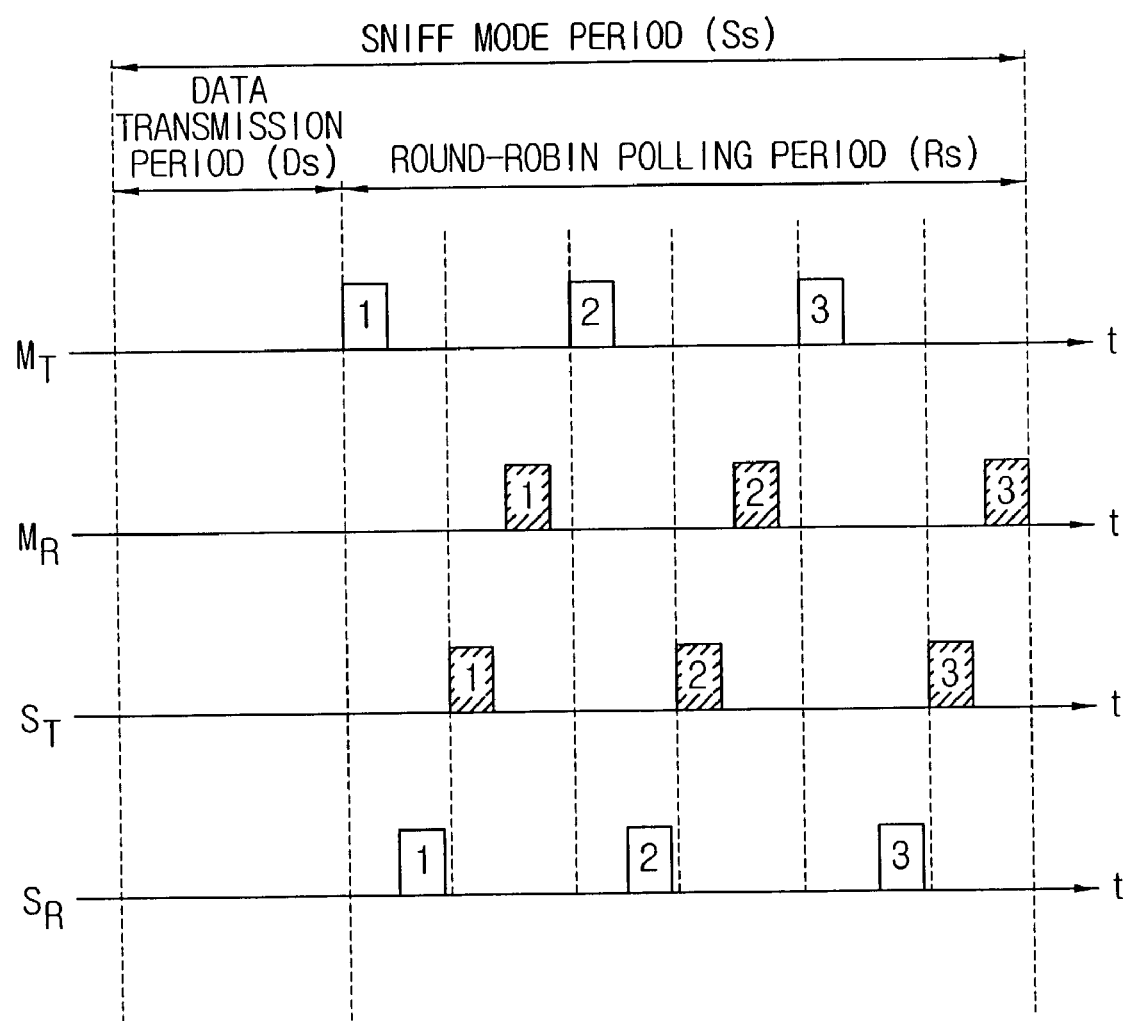
FIG. 5 is a view showing a transmission process of a polling packet according to a round-robin polling operation when there are three sniff slave apparatuses.

FIG. 5 is a view showing the transmission process of the polling packet according to the round-robin operation when there are three sniff slave apparatuses. In FIG. 5, a period for data communication of the sniff slave apparatuses 30, 32, 34 with the master apparatus 10 in the entire period according to a time axis (t) is a sniff mode period. The sniff mode period is divided into a data transmission period and a round-robin polling period. The data transmission period is the period for mutual data transmission between the master apparatus 10 and the sniff slave apparatuses 30, 32, 34 according to the communication scheduling. The round-robin polling period is the period for the master apparatus 10 to receive a response after transmitting the polling packet.

Referring to FIG. 5, when the master apparatus 10 transmits the polling packet to sniff slave apparatus associated with address 1 (N=1) within the round-robin polling period, the sniff slave apparatus associated with address 1 receives the polling packet that the master apparatus 10 has transmitted. At this time, the sniff slave apparatus associated with address 1 that has received the polling packet transmitted from the master apparatus 10 transmits some data such as a null packet or a data packet to the master apparatus 10. In other words, only the corresponding sniff slave apparatus that has received the polling packet of the master apparatus 10 within the round-robin polling period or has received the data packet of the master apparatus 10 within the allocated time of the sniff period can transmit the data packet or the null packet to the master apparatus 10 in a next slot.

FIG. 5 shows various time axes in regard to the time axis (t) in the round-robin polling period: a time axis ($M_T$) illustrates the master apparatus 10 transmitting the polling packet; a time axis ($M_R$) illustrates the master apparatus 10 receiving the null packet transmitted from the sniff slave apparatuses; a time axis ($S_T$) illustrates the sniff slave apparatuses transmitting the null packet to the master apparatus 10; and a time axis ($S_R$) illustrates the sniff slave apparatuses receiving the polling packet transmitted from the master apparatus 10.

Figures 6A, 6B:
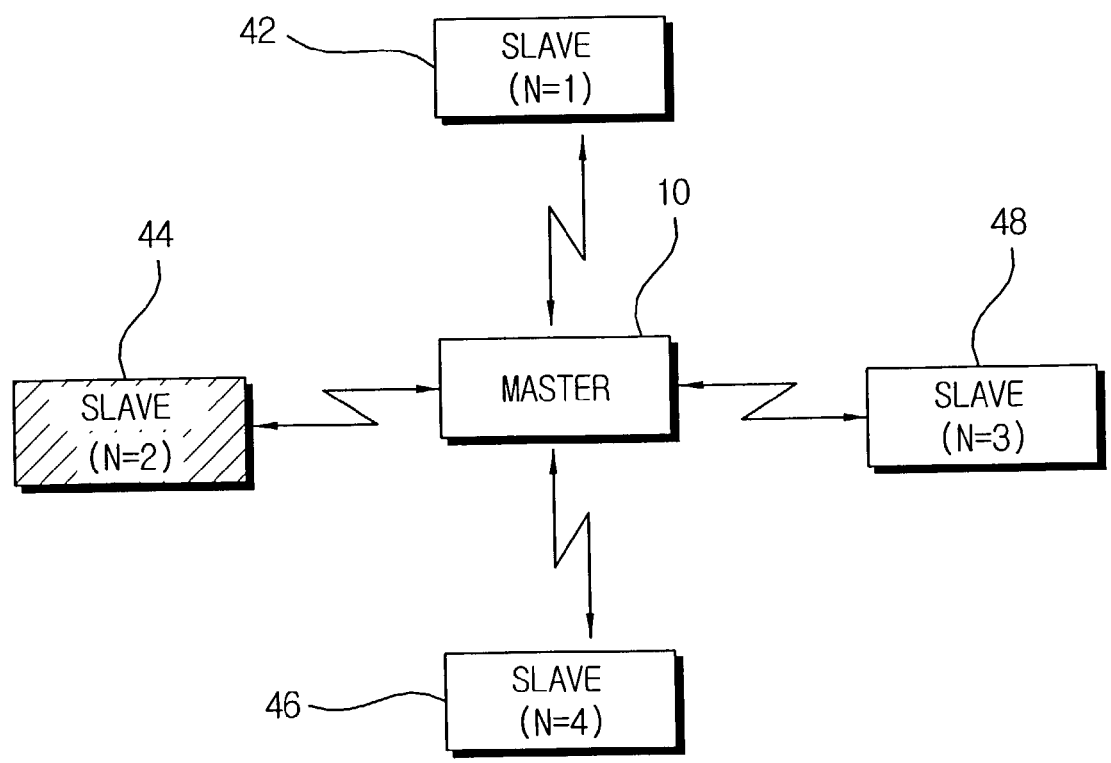
FIG. 6A is a view showing one example of the polling table of the master apparatus.
FIG. 6B is a view showing one example of the polling packet transmission according to FIG. 6A.

FIG. 6A is a view showing one example of the polling table of the master apparatus 10, and FIG. 6B is a view showing one example of the transmission of the polling packet according to FIG. 6A. First of all, FIG. 6A is the table value set up to transmit the polling packet 2 (P=2) to the sniff slave apparatus corresponding to address '2' (N=2). Therefore, as shown in FIG. 6B, the master apparatus 10 transmits the polling packet to the sniff slave apparatus 44 corresponding to the address information (N) is '2' (N=2) among the slave apparatuses 42, 44, 46, 48.

Figures 7A, 7B:
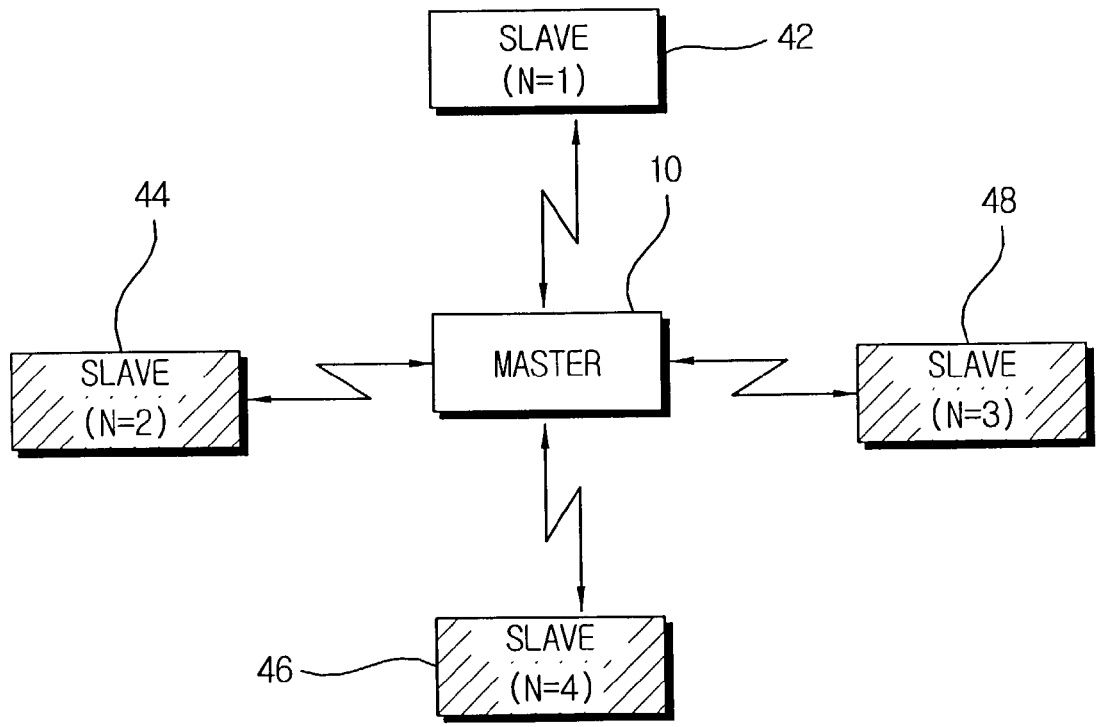
FIG. 7A is a view showing another example of the polling table of the master apparatus.
FIG. 7B is a view showing the transmission process of the polling packet according to FIG. 7A.

FIG. 7A is a view showing another example of the polling table of the master apparatus 10, and FIG. 7B is a view showing the process of the polling packet transmission according to FIG. 7A. First of all, FIG. 7A is the table value set up to transmit the polling packet to the sniff slave apparatus corresponding to the address information (N). According to FIG. 7A, the table value is set up to consecutively transmit the polling packet to the sniff slave apparatuses corresponding to the address information (N) is '4' (N=4), '2' (N=2), and '3' (N=3).

As shown in FIG. 7B, the master apparatus 10 first transmits the polling packet to the sniff slave apparatus 46 corresponding to the address information (N) is '4' (N=4) among the slave apparatuses 42, 44, 46, 48. Then, the master apparatus 10 transmits the polling packet to the sniff slave apparatus 44 corresponding to the address information (N) is '2' (N=2). Next, the master apparatus 10 transmits the polling packet to the sniff slave apparatus 48 corresponding to the address information (N) is '3' (N=3), after transmitting the polling packet to the sniff apparatus 44 that the address information (N) is '2' (N=2).

Accordingly, the master apparatus 10 performs communication with the sniff slave apparatuses 42, 44, 46, 48 during the allocated time of the sniff period. Additionally, the master apparatus 10 can maintain the communication connection with sniff slave apparatuses that have not received any of packets from the master apparatus 10 during the allocated time of the sniff period by setting up the round-robin polling period within the allocated time of the sniff period, transmitting the polling packet to each of the sniff slave apparatuses 42, 44, 46, 48, and receiving the packet from the sniff slave apparatuses 42, 44, 46, 48 according to the transmission, to provide a connection opportunity to the sniff slave apparatuses that have failed to communicate with the master apparatus 10 during the allocated time of the sniff period.

FIG. 8 is a flow chart showing a communication method for performing the communication by commonly having the allocated time of the sniff period according to the present invention. First of all, the master apparatus 10 judges whether the operation mode of the slave apparatuses is the sniff mode in accordance with the control of a user (S 10). It is preferable that a predetermined time is set up so that the slave apparatuses can communicate with the master apparatus 10 during the allocated time of the sniff period when the slave apparatuses are operated in the sniff mode before the step 10.

When the master apparatus 10 judges that the operation mode of the slave apparatuses is not the sniff mode in the step 10, the master apparatus 10 performs an operation corresponding to the operation mode of the slave apparatuses selected by the user (S 12). In the step 10, when the operation mode of the slave apparatuses is judged as the sniff mode, the master apparatus 10 performs the data transmission with the sniff slave apparatuses 42, 44, 46, 48. At this time, the master apparatus 10 judges whether there is any data transmitted from the sniff slave apparatuses 42, 44, 46, 48 (S 16). When it is judged that there is no transmitted data, the master apparatus 10 performs the step 14.

When it is judged that there is data transmitted from the sniff slave apparatuses 42, 44, 46, 48 in the step 16, the master apparatus 10 calculates the number of slots (Sr) remaining of all the slots (St) set up as the allocated time of the sniff period (S 18). The number of slots (Sr) remaining in the allocated time of the sniff period in the master apparatus 10 can be calculated by subtracting the time of the communication with the sniff slave apparatuses 42, 44, 46, 48 from the number of entire slots (St).

The master apparatus 10 judges that the subtracted value is '0' by calculating the number (Sn) of the sniff slave apparatuses connected with the master apparatus 10 from the number of remaining slots (Sr) during the mutual data transmission with the sniff slave apparatuses 42, 44, 46, 48 (S 20). In other words, the master apparatus 10 judges whether the number of remaining slots (Sr) and the number of the sniff slave apparatuses are equal.

When it is judged that the number of remaining slots (Sr) is different from the number of the sniff slave apparatuses (Sn) in the step 20, the master apparatus 10 performs the steps 14 through 18. When it is judged that the number of remaining slots (Sr) and the number of the sniff slave apparatuses (Sn) are equal in the step 20, the master apparatus 10 performs the round-robin polling operation for transmitting the polling packet to the sniff slave apparatus having the corresponding address based on the set up polling table (S 22). The master apparatus 10 judges whether there is any remained slot while performing the round-robin polling operation (S 24).

When it is judged that there is a remaining slot in the step 24, the master apparatus 10 performs the operation of the step 22. When it is judged that there is no remaining slot in the step 24, the master apparatus 10 ends the communication in the sniff mode with the sniff slave apparatuses 42, 44, 46, 48, and performs data transmission with a slave that is the active mode (S 26).

Accordingly, as the communication with the sniff slave apparatuses controlled by the master apparatus 10 is commonly used during the allocated time of the sniff mode, the sniff parameter that is operation information according to the sniff mode can become simpler. Moreover, as the polling packet is transmitted to the respective sniff slave apparatuses from the time that the number of the remaining slot (Sr) and the number of the sniff slave apparatuses (Sn) are equal in the set-up time of the sniff mode, the sniff slave apparatuses can be prevented from not being connected with the master apparatus 10 during the allocated time of the sniff period.

According to the present invention, since the master apparatus sets up the time for the communication with the sniff slave apparatuses, and allows the sniff slave apparatuses to commonly use the set-up time, time for mutual communication in the allocated time of the sniff period can be saved. Further, the amount of memory needed for the master apparatus 10 also can be reduced, as the master apparatus 10 provides the common sniff parameter to the sniff slave apparatuses even when there are plurality of sniff slave apparatuses. In addition, since the polling packet based on the polling table is transmitted to the corresponding sniff slave apparatuses from the time that the number of the remaining slots (Sr) and the number of the sniff slave apparatuses (Sn) are equal during the allocated time of the sniff period, sniff slave apparatuses can be prevented from not being connected with the master apparatus 10 by not being transmitted a packet from the master apparatus 10 during the allocated time of the sniff period.

So far, the preferred embodiments of the present invention have been illustrated and described. However, the present invention is not limited to the preferred embodiments described here, and someone skilled in the art can modify the present invention without departing from the spirit of the present invention claimed in the claims.

What is claimed is:

1. A wireless communication system, comprising:
a master apparatus for calculating a sniff parameter including a time of a sniff period capable of performing a communication by allowing a corresponding device to commonly use the time in a sniff mode when a communication mode for mutual data transmission is selected by a user to be operated in the sniff mode; and
one or more sniff slave apparatuses for performing the mutual data transmission with the master apparatus by commonly using the time calculated in accordance with the sniff parameter,
wherein the master apparatus performs a communication scheduling for data communication of the one or more sniff slave apparatuses, when the sniff parameter is calculated, and
wherein the master apparatus comprises:
a parameter storage unit for storing the sniff parameter;
a time counting unit for allowing the master apparatus to count a time during an allocated time of a sniff period according to the sniff mode based on an operation time in regard to the sniff mode included in the sniff parameter; and
a controller for controlling the data communication with the one or more sniff slave apparatuses, and counting a number of the one or more sniff slave apparatuses operated in the sniff mode to perform the communication scheduling.

2. A wireless communication system, comprising:
a master apparatus for calculating a sniff parameter including a time of a sniff period capable of performing a communication by allowing a corresponding device to commonly use the time in a sniff mode, when a communication mode for mutual data transmission is selected by a user to be operated in the sniff mode; and
one or more sniff slave apparatuses for performing the mutual data transmission with the master apparatus by commonly using the time calculated in accordance with the sniff parameter,
wherein the master apparatus performs a communication scheduling for data communication of the one or more sniff slave apparatuses, when the sniff parameter is calculated,
wherein the sniff parameter includes at least one among a cyclic information, an allocated time information of the sniff period, and a start time information in which the one or more sniff slave apparatuses are operated in the sniff mode, and
wherein the master apparatus performs the communication with the one or more sniff slave apparatuses according to the communication scheduling set up in regard to the one or more sniff slave apparatuses, and performs a round-robin polling operation that transmits a polling packet so that there is no sniff slave apparatus unable to receive a packet from the master apparatus during the allocated time of the sniff period in the communication operation according to the communication scheduling.

3. The wireless communication system of claim 2, wherein the controller sets up a polling table including an address information with respect to the one or more sniff slave apparatuses for transmitting the polling packet in accordance with the round-robin polling operation, and the parameter storage unit stores the polling table.

4. The wireless communication system of claim 3, wherein the time for the master apparatus to perform the round-robin polling operation is a time that a number of slots remaining in a corresponding slot of the allocated time of the sniff period is equal to a number of the one or more sniff slave apparatuses.

5. The wireless communication system of claim 4, wherein the master apparatus transmits the polling packet from the sniff slave apparatus that initially transmits the data to the master apparatus during the allocated time of the sniff period according to the round-robin polling operation.

6. The wireless communication system of claim 5, wherein the master apparatus transmits the polling packet to a corresponding sniff slave apparatus one at a time respectively.

7. The wireless communication system of claim 6, wherein the controller ends the communication with the one or more sniff slave apparatuses with respect to the master apparatus, when there is no slot remaining in the allocated time of the sniff period.

8. A wireless communication method between a master apparatus that mutually communicates wirelessly with one or more sniff slave apparatuses during an allocated time of a sniff period, including the steps of:

calculating a sniff parameter and a predetermined time for the one or more sniff slave apparatuses to perform the mutual communication by commonly using the time with respect to the master apparatus, when the one or more sniff slave apparatuses are set up to be operated in the sniff mode; and performing the mutual communication by the master apparatus and the one or more sniff slave apparatuses in accordance with the sniff parameter during the calculated time, after the communication performing step, further including the steps of:

setting up a polling table including a polling packet for providing a connection opportunity in regard to the sniff slave apparatus that has not received a packet from the master apparatus during the allocated time of the sniff period according to the sniff parameter, and an address information with respect to the sniff slave apparatus to receive the polling packet;

judging whether a number of slots remaining in the sniff mode and a number of the sniff slave apparatus are equal; and transmitting the polling packet to the sniff slave apparatus according to the address information, when it is judged that the number of slots remaining in the sniff mode and the number of the one or more sniff slave apparatuses are equal.

* * * * *